US007257559B2

(12) United States Patent
Komiya (10) Patent No.: US 7,257,559 B2
(45) Date of Patent: Aug. 14, 2007

(54) MATERIAL SALES SYSTEM

(75) Inventor: Kyosuke Komiya, Okayama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 568 days.

(21) Appl. No.: 10/258,485

(22) PCT Filed: Apr. 27, 2001

(86) PCT No.: PCT/JP01/03735

§ 371 (c)(1),
(2), (4) Date: Oct. 25, 2002

(87) PCT Pub. No.: WO01/84409

PCT Pub. Date: Nov. 8, 2001

(65) Prior Publication Data

US 2003/0130962 A1    Jul. 10, 2003

(30) Foreign Application Priority Data

Apr. 27, 2000   (JP)   ............................. 2000-128479

(51) Int. Cl.
*G06Q 00/99* (2006.01)
(52) U.S. Cl. .............................. 705/400; 705/1; 705/5; 705/7; 705/400; 703/7
(58) Field of Classification Search ................ 705/7–8, 705/10, 20, 1, 400; 364/464.01; 380/4; 700/217
See application file for complete search history.

(56) References Cited

U.S. PATENT DOCUMENTS

| | | | |
|---|---|---|---|
| 5,249,120 A * | 9/1993 | Foley | 705/1 |
| 5,761,301 A * | 6/1998 | Oshima et al. | 705/57 |
| 5,793,632 A * | 8/1998 | Fad et al. | 705/400 |
| 5,914,878 A * | 6/1999 | Yamamoto et al. | 700/106 |
| 6,564,226 B1 * | 5/2003 | Dickson et al. | 707/104.1 |
| 6,775,647 B1 * | 8/2004 | Evans et al. | 703/7 |
| 2001/0023418 A1* | 9/2001 | Suzuki et al. | 705/400 |
| 2002/0013719 A1* | 1/2002 | Shiiba et al. | 705/7 |
| 2004/0015391 A1* | 1/2004 | Dupreez et al. | 705/11 |

FOREIGN PATENT DOCUMENTS

| | | | |
|---|---|---|---|
| JP | 7-141434 A |  | 6/1995 |
| JP | 07141434 A | * | 6/1995 |
| JP | 10-207954 A |  | 8/1998 |
| JP | 10-207955 A |  | 8/1998 |

OTHER PUBLICATIONS

Blake, Peter, "fob.com Launches foboplastics", Jun. 10, 2000; PR Newswire. New York, p. 1.*
Guy, Sandra, "Industrial-supply network takes off on the Internet Prime Advantage a platform for top suppliers, high-volume sellers", Sep. 27, 2000; Chicago Sun-Times., p. 73.*
Blake, Peter, "fob.com Launches foboplastics", Jun. 10, 2000; PR Newswire. New York, p. 1.*

* cited by examiner

*Primary Examiner*—John W. Haynes
*Assistant Examiner*—Freda Nelson
(74) *Attorney, Agent, or Firm*—Birch, Stewart, Kolasch & Birch, LLP (57) ABSTRACT

A computer (10) of a material supply company calculates a sales price of a material according to a state of production of a product, which is produced using a material supplied from the material supply company, and informs a computer (30) of a result of the calculation. The state of production of the product is measured by a measurement apparatus (32), and a result of the measurement is sent to the computer (10).

6 Claims, 4 Drawing Sheets

MATERIAL SALES SYSTEM

This application is the national phase under 35 U.S.C. 0371 of PCT International Application No. PCT/JP01/03735 which has an International filing date of Apr. 27, 2001, which designated the United States of America.

FIELD OF THE INVENTION

The present invention relates to a material sales system for supplying a material from a material supply company to a product manufacturing company and manufacturing a product in the product manufacturing company using the material. More specifically, the present invention relates to a material sales system for automatically varying a price of a material to be sold according to a state of production in a production facility.

BACKGROUND ART

Conventionally, there is known a method of connecting a computer (product sales system) of a product manufacturing company and a computer of a product purchase company via a communication line and sending a sales price of a product from the computer of the product manufacturing company to the computer of the product purchase company to advise the sales price.

In a material sales system for supplying a material from a material supply company to a product manufacturing company and manufacturing a product in the product manufacturing company using the material, a material price is generally arranged in advance between the material supply company and the product manufacturing company. Usually, the product manufacturing company requires the material from the material supply company meet a quality within a specific specification.

If a material meets the required specification, the material supply company often sells the material at a high price as a first grade product. If a material does not meet the required specification, the material supply company often sells the material at a low price as an off-spec product.

However, a specification that the product manufacturing company requires of the material supply company is not always a specification that is actually needed in manufacturing a product in many cases. In such a case, the material supply company spends production costs, which are essentially unnecessary, in order to observe the specification. As a result, a material price increases.

In addition, for example, if a material meets 99% of a required specification but does not meet the remaining 1% of the required specification, the material supply company can only sell the material at a low price as a second grade product, that is, an off-spec product, for an application that requires low performance. However, the material can actually be used in the product manufacturing company without any significant problem in many cases. In such a case, the material supply company suffers a significant damage.

On the other hand, even if the material supply company tries to meet a required specification, it may be impossible to inspect all materials. Thus, an inappropriate material may be sold to the product manufacturing company and cause a problem in manufacturing a product. In such a case, the product manufacturing company suffers detriment despite the fact that it pays a price of a first grade product, and a trouble occurs between the companies.

Such a trouble is processed between a person of the product manufacturing company and a person of the material supply company by telephone communication or the like, which takes a long time.

SUMMARY OF THE INVENTION

The present invention has been devised in order to solve the above-described various problems due to a material price that is fixed by a contract in advance, and it is an object of the present invention to provide a material sales system that can rationally determine a sales price in accordance with a level at which a material meets required performance, which is actually necessary for a product, and prevent trouble between a material supply company and a product manufacturing company.

According to the present invention, a material sales system is provided which is equipped with inputting means for inputting a parameter representing a state of production of a product that is manufactured using a material supplied from the material supply company to the product manufacturing company, and information processing means for determining a sales price of a material using at least the parameter input by the inputting means and outputting means for outputting the determined sales price.

According to the present invention, in the material sales system, the inputting means may be installed in the product manufacturing company.

According to the present invention, in the material sales system, a part of the information processing means may be installed in the product manufacturing company and another part of the information processing means may be installed in the material supply company.

According to the present invention, in the material sales system, communication means may be provided in each of the material supply company and the product manufacturing company, and it may be possible to send and receive at least one of a parameter representing a state of production of a product and a sales price between both the communication means through a communication line.

According to the present invention, in the material sales system, the parameter may be information for calculating a product yield.

According to the present invention, in the material sales system, the material may be resin and the product may be a resin product.

According to the present invention, in the material sales system, the product may be an optical disk or an optical disk substrate.

According to another aspect of the present invention, a terminal apparatus is provided which is equipped with inputting means for inputting a parameter representing a state of production of a product that is manufactured using a material supplied from a material supply company to a product manufacturing company and outputting means for outputting information, wherein a sales price of a material is determined by an information processing apparatus in the outside using the input parameter and the determined sales price of the material is outputted from the outputting means.

In the present invention, a material means an article that a product manufacturing company purchases from a material supply company, which is a raw material or a part to be used by the product manufacturing company in manufacturing a product. For example, if an automobile is a product, a tire, a steel plate, paint, window glass and the like correspond to a material. In addition, resin such as polycarbonate that is used in manufacturing an optical disk is also a material in the present invention. In the present invention, resin such as polystyrene, polycarbonate or polypropylene is particularly preferable.

In the present invention, a product means an article that the product manufacturing company manufactures by processing or combining the above-described materials. The product of the present invention includes not only an end product that is manufactured in the product manufacturing company but also an intermediate product. For example, in a product manufacturing company that manufactures an optical disk, both an optical disk as an end product and an optical disk substrate as an intermediate product are products. In the present invention, a resin product such as a housing, a sheet or an optical disk substrate is preferable.

The present invention is particularly preferably utilized in the case in which a quality of a material contributes significantly in determining a state of production of a product. For example, if polycarbonate is a material and an optical disk substrate is a product, since a quality of the polycarbonate such as a foreign matter content contributes to a yield of the optical disk substrate significantly, the material sales system of the present invention is preferably utilized.

In the present invention, a parameter representing a state of a product means information for calculating a production efficiency of a product and any parameter relating to a production efficiency, a production speed, a quality and the like. More specifically, the parameter includes a material supply amount for manufacturing a product, a production amount of a product, an amount of defective goods, appropriateness in terms of a quality, a material supply amount, a yield, that is, a ratio of a product production amount per a unit material amount, and productivity, that is, a production amount per a unit time.

In the present invention, inputting means for inputting a parameter representing a state of production of a product means a measurement apparatus, an input terminal or the like for a quality or the like of a product. A parameter may be input by a human from a terminal or may be directly input from the measurement apparatus. A method of directly inputting a parameter from the measurement apparatus is preferable in that a correct value can be input objectively. The inputting means is usually connected to a computer having information processing means explained later. An input parameter representing a state of production is usually stored in a database within the computer and is used for determining a sales price of a material by the information processing means explained later. The information processing means is preferably installed in a product manufacturing company.

In the present invention, the information processing means for determining a sales price of the above-described material using at least a parameter input by the above-described inputting means is means for determining a sales price of a material in accordance with a formula defined in advance. A different material price is calculated by the information processing means according to a value of the parameter.

For example, it is possible to realize a system for setting a high material price if a product yield is high and setting a low material price if a product yield is low. A parameter input by the inputting means may be directly used in a formula for price decision or may be once used for calculating another parameter, which is used for a formula for price decision. The former example is the case in which a product yield is input by the inputting means and the product yield is used in a formula for price decision. The latter example is the case in which a product yield is calculated as another parameter from an amount of a material supplied to a manufacturing process and an amount of a product manufactured in the manufacturing process, which are input by the inputting means, and the product yield is used in the formula for price decision.

The above-described information processing means may be installed in a product manufacturing company or may be installed in a material supply company. In addition, a part of the above-described information processing means may be installed in the product manufacturing company and another part of the information processing means may be installed in the material supply company to constitute the information processing means as a whole. Such a case is specifically explained as a case in which a product yield is calculated by a computer A, which is a part of the above-described information processing means, in the product manufacturing company according to a parameter input by the above-described inputting means, the calculated product yield is transmitted to the material supply company, and the material supply company determines a sales decision price by a formula defined in advance using the product yield by a computer B, which is another part of the information processing means.

In the present invention, the outputting means for outputting a sales price is an apparatus for outputting information by some means, and is usually a display or a printer of a terminal. In addition, as the output apparatus, a disk drive for writing information in a recording medium such as a floppy disk and a communication apparatus for sending information to other information processing apparatuses are included in the concept of the output apparatus. The outputting means may be installed in the material supply company, may be installed in the product manufacturing company or many be installed in both the companies.

In the present invention, the communication means is means for sending and receiving at least one of a parameter representing a state of production of a product and a sales price between the material supply company and the product manufacturing company through a communication line. Preferable communication means can be used according to a type of a communication line such as a modem, a terminal adaptor or an LAN card that is incorporated in the above-described computer A or B or connected to the outside. In addition, an apparatus dedicated to communication may be simply used. Preferably, it is possible to send and receive at least one of a parameter representing a state of production of a product and a sales price between the material supply company and the product manufacturing company through a communication line. If the computer A having communication means discussed above and the computer B having communication means are connected by a communication line, the information processing means and the communication means may be installed in the material supply company, the inputting means and the communication means may be installed in the product manufacturing company, and both the communication means may be connected by the communication line.

The communication line means a line through which information can be sent and received by wire or wireless communication. A dedicated telephone line or a general public telephone line may be used as the communication line. In addition, the communication line may be used within a closed area such as an LAN, or a communication line that is made public such as the Internet may be used.

BEST MODE FOR CARRYING OUT THE INVENTION

Embodiments of the present invention will be described in detail with reference to the accompanying drawings.

First Embodiment

Figure 1:
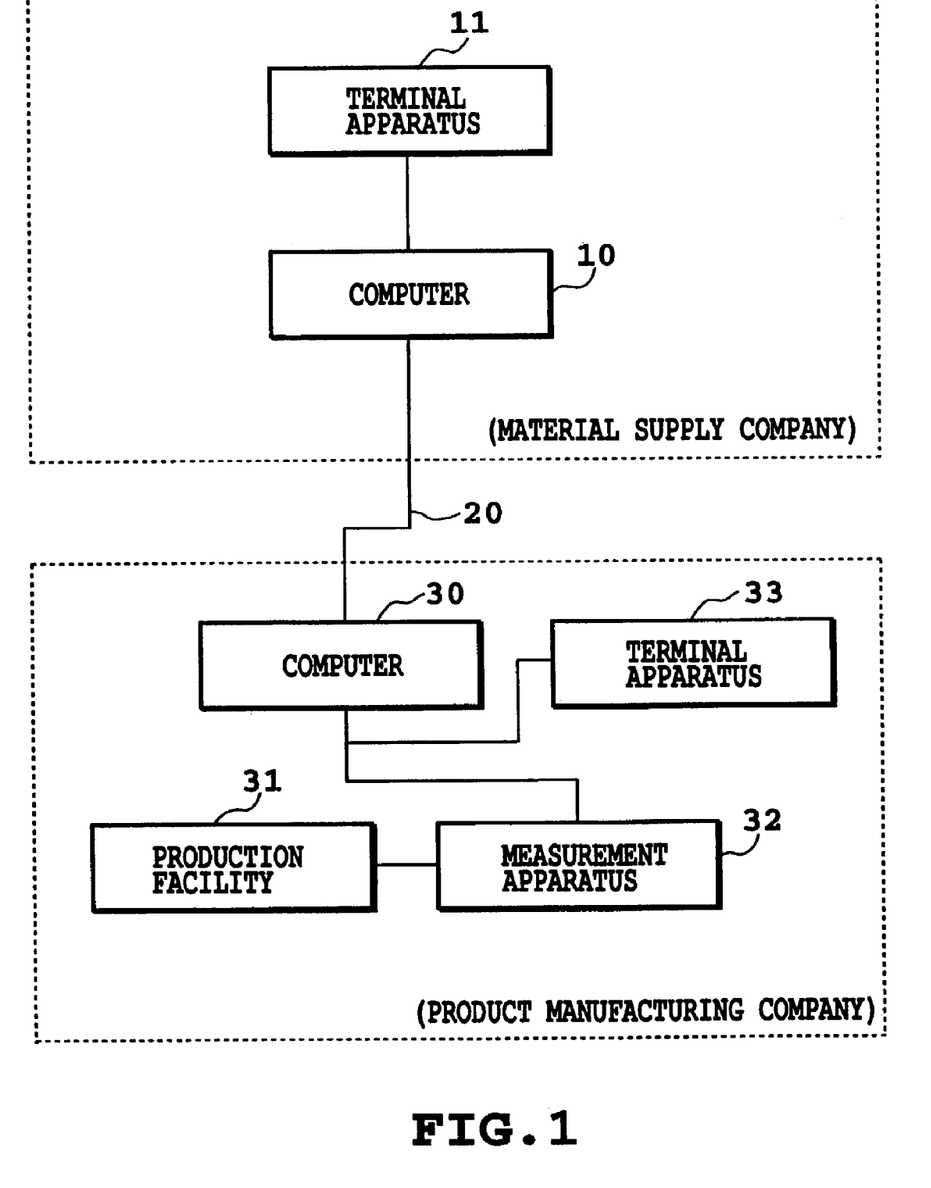
FIG. 1 is a block diagram showing a system configuration of a first embodiment of the present invention.

FIG. 1 shows a system configuration of a material sales system to which the present invention is applied.

In FIG. 1, reference numeral 10 denotes a computer (which is another part of information processing means of the present invention and has a modem or the like as communication means) installed in a material supply company, to which a terminal apparatus 11 is connected by an LAN. Reference numeral 11 denotes a terminal apparatus that is capable of inputting data in the computer 10 and displaying (outputting) stored contents of a database installed in the computer 10, sales price of a material that is determined from a parameter representing a state of production of a product discussed later or a state of a product. The terminal apparatus 11 functions as outputting means of the present invention. Reference numeral 20 denotes a communication line connecting a computer 30 discussed later and the computer 10.

Reference numeral 30 denotes a computer (which is a part of the information processing means of the present invention and has a modem or the like as communication means) installed in a product manufacturing company that manufactures a product using a material supplied from the material supply company. Reference numeral 31 denotes a production facility that manufactures a product using a material supplied from the material supply company. Reference numeral 32 denotes a measurement apparatus (inputting means of the present invention) that measures information for calculating a state amount of production, that is, a yield in this embodiment, of the production facility 31. As the state amount of production, in addition to the above, a preferable parameter such as a measurement apparatus for measuring a quality of a product, a production amount of a product or the like can be used according to a type of a product. Reference numeral 33 denotes a terminal apparatus (inputting means and/or outputting means of the present invention) that is capable of inputting data in the computer 30, displaying stored contents of a database installed in the computer 30 and displaying (outputting) a sales price of a material that is determined from a parameter representing a state of production of a product discussed later or a state of production of a product.

Figure 2:
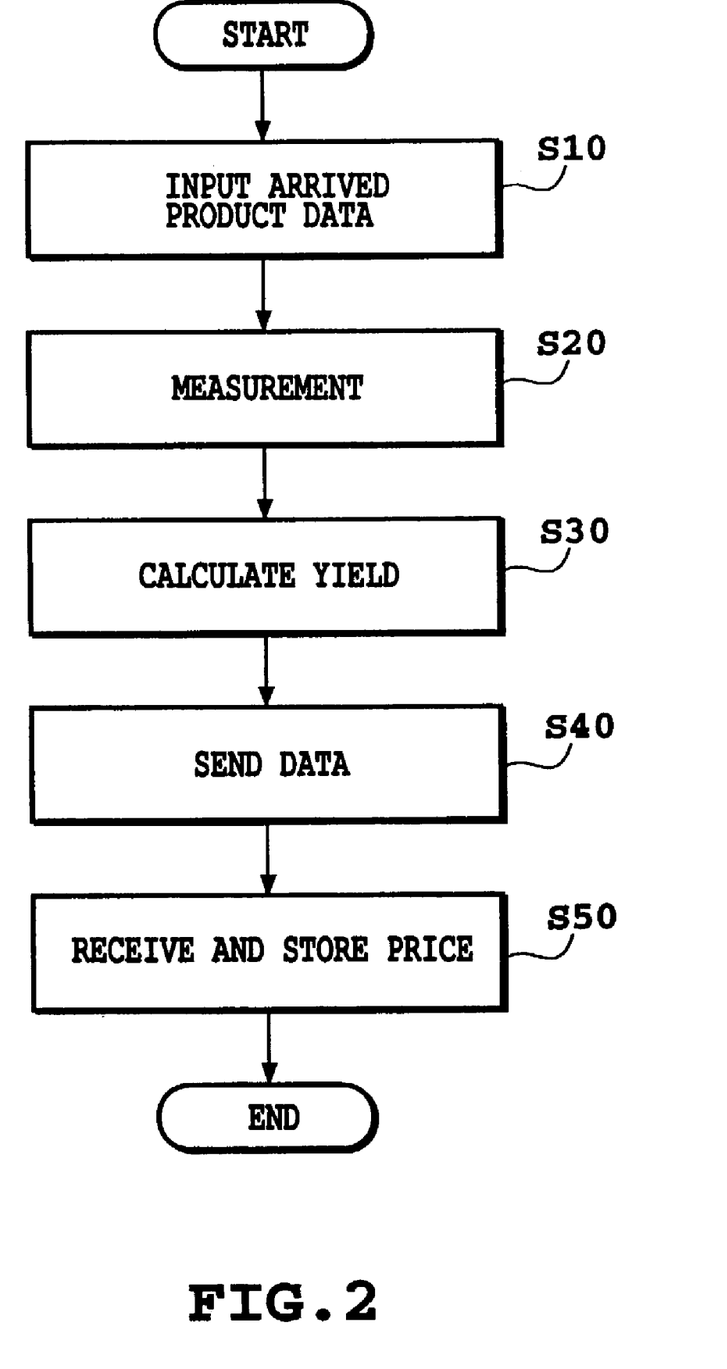
FIG. 2 is a flow chart showing processing procedures of a computer 30.
Figure 3:
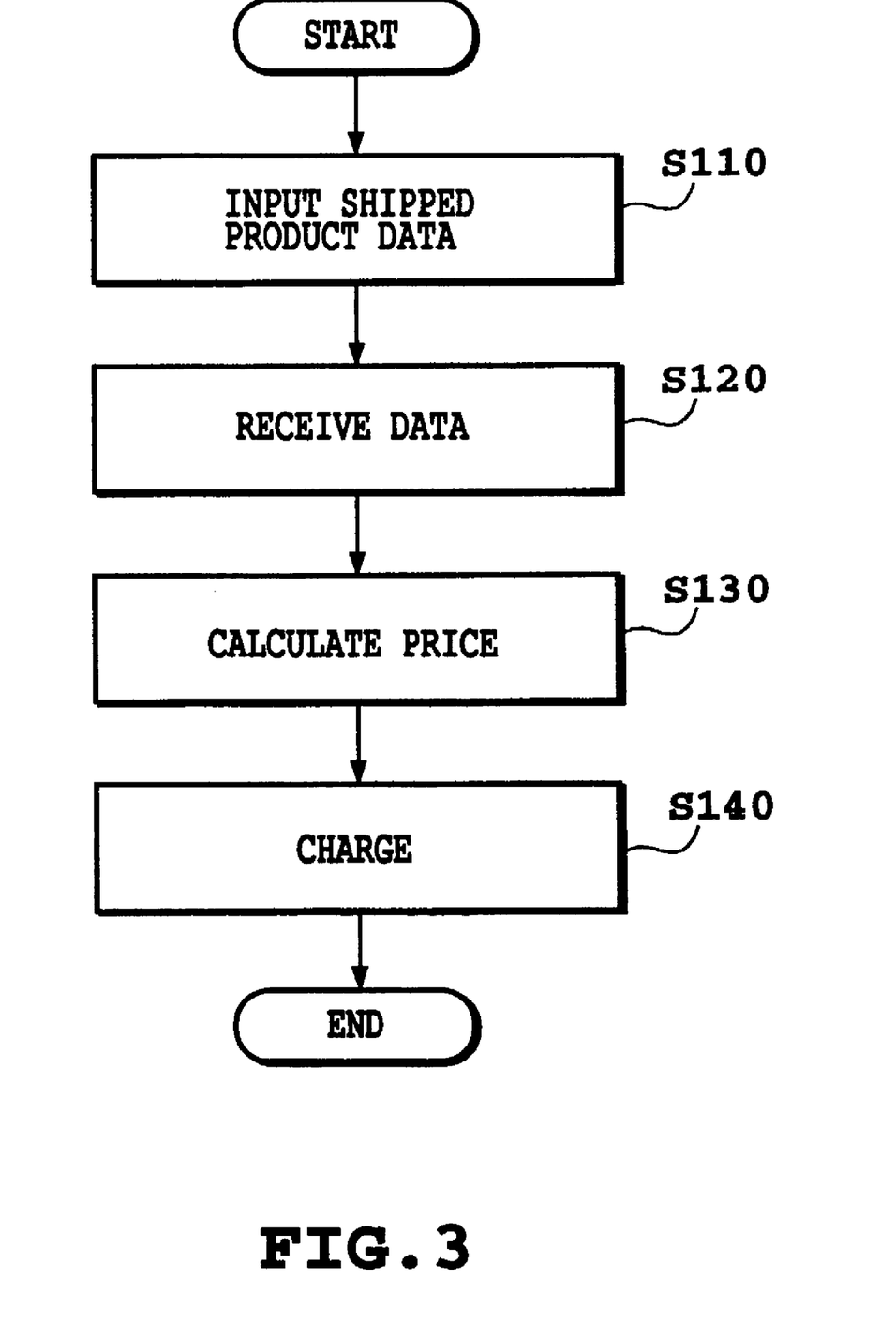
FIG. 3 is a flow chart showing processing procedures of a computer 10.

Sales processing to be executed by such a system configuration will be described with reference to the flow charts of FIGS. 2 and 3. FIG. 2 shows processing procedures executed by the computer 30 of the product manufacturing company. FIG. 3 shows processing procedures executed by the computer 10 of the material supply company.

Descriptions will be made with the case in which a material is polycarbonate as an example. Polycarbonate is shipped from the material supply company (hereinafter referred to as A company) to the product manufacturing company (hereinafter referred to as B company). In doing so, information such as date and time of shipment is input from the terminal apparatus 11. The input information (information in the lowermost column of Table 1) is stored in the database within the computer 10 as shown in Table 1 (step S110 of FIG. 3).

TABLE 1

| Data and time of shipment | Grade | Lot | Selling company | Product name | Yield | Reference price | Sales price | Sales amount |
|---|---|---|---|---|---|---|---|---|
| '99.2.2.10:40 | 2 | X100 | O Company | Lighting | 0.98 | 300 | 294 | 10 |
| '99.2.4.11:50 | 1 | X200 | x Company | Disk | 0.97 | 350 | 330.5 | 20 |
| '99.3.7.10:00 | 1 | X103 | B company | Disk | — | 350 | | 30 |

The transported polycarbonate is received by the product manufacturing company (B company) and supplied to the production facility 31. In doing so, information concerning the polycarbonate supplied to the production facility 31 (a purchase amount of a material or the like, information in the lowermost column of Table 2) is stored in the database within the computer 30 as shown in Table 2 by input from the terminal apparatus 33 or through the communication line 20 from the computer 10 (step S10 of FIG. 2).

TABLE 2

| Date and time of arrival | Grade | Lot | Purchasing company | Yield | Purchase price | Purchase amount | Amount of good product |
|---|---|---|---|---|---|---|---|
| '99.2.3.13:40 | 1 | Y100 | Δ Company | 0.98 | 370 | 15 | 14.7 |
| '99.2.5.13:50 | 2 | Z200 | □ Company | 0.97 | 320 | 25 | 24.25 |
| '99.3.7.10:00 | 1 | X103 | B Company | | | 30 | |

A product produced in the production facility 31 is checked whether it is appropriate as a product in the measurement apparatus 32. Information on appropriateness of the product is sent to the computer 30 and stored in the database within the computer 30 (step S20 of FIG. 2). A yield (product yield) is calculated by the computer 30 from the supply amount of the polycarbonate stored in the database of the computer 30 and the information on appropriateness of the product (step S30 of FIG. 2). The calculated yield is stored in the database within the computer 30 and, at the same time, transmitted to the computer 10 of the A company through the communication line 20 (step S40 of FIG. 2).

The transmitted yield is stored in the database within the computer 10 (step S120 of FIG. 3). In addition, the yield is substituted for a yield in a relational expression of a yield and a material price (expression 1 below) defined in advance between the A company and the B company to calculate a price of the polycarbonate shipped this time (step S130 of FIG. 3). The calculated price of the polycarbonate is stored in the database and, at the same time, transmitted to the B company through the communication line 30, and the B company is charged (step S140). The transmitted price of the polycarbonate is stored in the database 25 and, thereafter, the B company pays based on the transmitted price (step S50 of FIG. 2). Further, payment may be made online by a method that is conventionally well known. In addition, the sales price and other data stored in the database are outputted to be displayed on the terminal apparatus 33 or outputted to be printed.

At the point when the price of the polycarbonate is stored in the database within the computer 30, stored contents of the database within the computer 10 are as shown in Table 3 and stored contents of the database within the computer 30 are as shown in Table 4.

It is sufficient to create a relation expression of a yield and a material price properly. For example, a relation expression as shown below is possible.

$$\text{Price} = \alpha \times \text{Reference price} \times (\text{Yield} + \beta) \tag{1}$$

Here, $\alpha$ is usually 1. However, since the product manufacturing company becomes unprofitable if the yield is too small, $\alpha$ may be set equal to or lower than 1. For example, if the yield is 0 to 50%, $\alpha$ is set to 0.8, and if the yield is 50 to 80%, the $\alpha$ is set to 0.9 and if the yield is more than 80%, the $\alpha$ is set to 1.0. $\beta$ is set taking into account a factor that causes the yield to decrease due to manufacturing of a product regardless of a material. For example, if a material is perfect but the yield is 97%, $\beta$ is set to 0.03.

As described above, according to the sales system of this embodiment, the price falls if the yield is bad. Thus, the system is secure for the product manufacturing company. On the other hand, the material supply company can sell even a somewhat defective material without being anxious about a claim. In addition, usually, prices of products other than a first grade product (second grade product, off-grade) extremely falls. However, according to the present invention, such products can be sold at reasonable prices. In this embodiment, both the material supply company and the product manufacturing company can evaluate a material rationally on the basis of a common criterion of the product yield. Thus, an effort to observe a useless specification unrelated to the product yield is no more necessary, and total manufacturing costs can be controlled low.

In addition, in this embodiment, for the material supply company that has been setting a large number of grades in order to observe a specification set by the product manufacturing company, there is a merit in that a material of the same grade can be supplied to each product manufacturing company. That is, if a material of a single grade can be supplied to product manufacturing companies and sold for a price corresponding to a yield, this may be often more advantageous in terms of earnings than manufacturing products of a large number of grades with increased manufacturing costs.

As described above, in this embodiment, in short, the present invention has a lot of merits for the material supply company in that a rational sales price can be maintained and, at the same time, it is no more necessary to meet an excessive specification required by the product manufacturing company and it becomes possible to reduce the number of grades to be manufactured to realize cost reduction by obtaining a rational evaluation criterion of the product yield. In addition, the present invention is advantageous in that a low price can be required for a material with a bad product yield. Further, since rational judgment can be made for a

TABLE 3

| Data and time of shipment | Grade | Lot | Selling company | Product name | Yield | Reference price | Sales price | Sales amount |
|---|---|---|---|---|---|---|---|---|
| '99.2.2.10:40 | 2 | X100 | O Company | Lighting | 0.98 | 300 | 294 | 10 |
| '99.2.4.11:50 | 1 | X200 | x Company | Disk | 0.97 | 350 | 330.5 | 20 |
| '99.3.7.10:00 | 1 | X103 | B company | Disk | 0.99 | 350 | 346.5 | 30 |

TABLE 4

| Date and time of arrival | Grade | Lot | Purchasing company | Yield | Purchase price | Purchase amount | Amount of good product |
|---|---|---|---|---|---|---|---|
| '99.2.3.13:40 | 1 | Y100 | Δ Company | 0.98 | 370 | 15 | 14.7 |
| '99.2.5.13:50 | 2 | Z200 | □ Company | 0.97 | 320 | 25 | 24.25 |
| '99.3.7.10:00 | 1 | X103 | B Company | 0.99 | 346.5 | 30 | 29.7 | material on the basis of a common criterion of the product yield, total product manufacturing costs for the material supply company and the product manufacturing company can be controlled low without the necessity of meeting an excessive specification.

Second Embodiment

Figure 4:
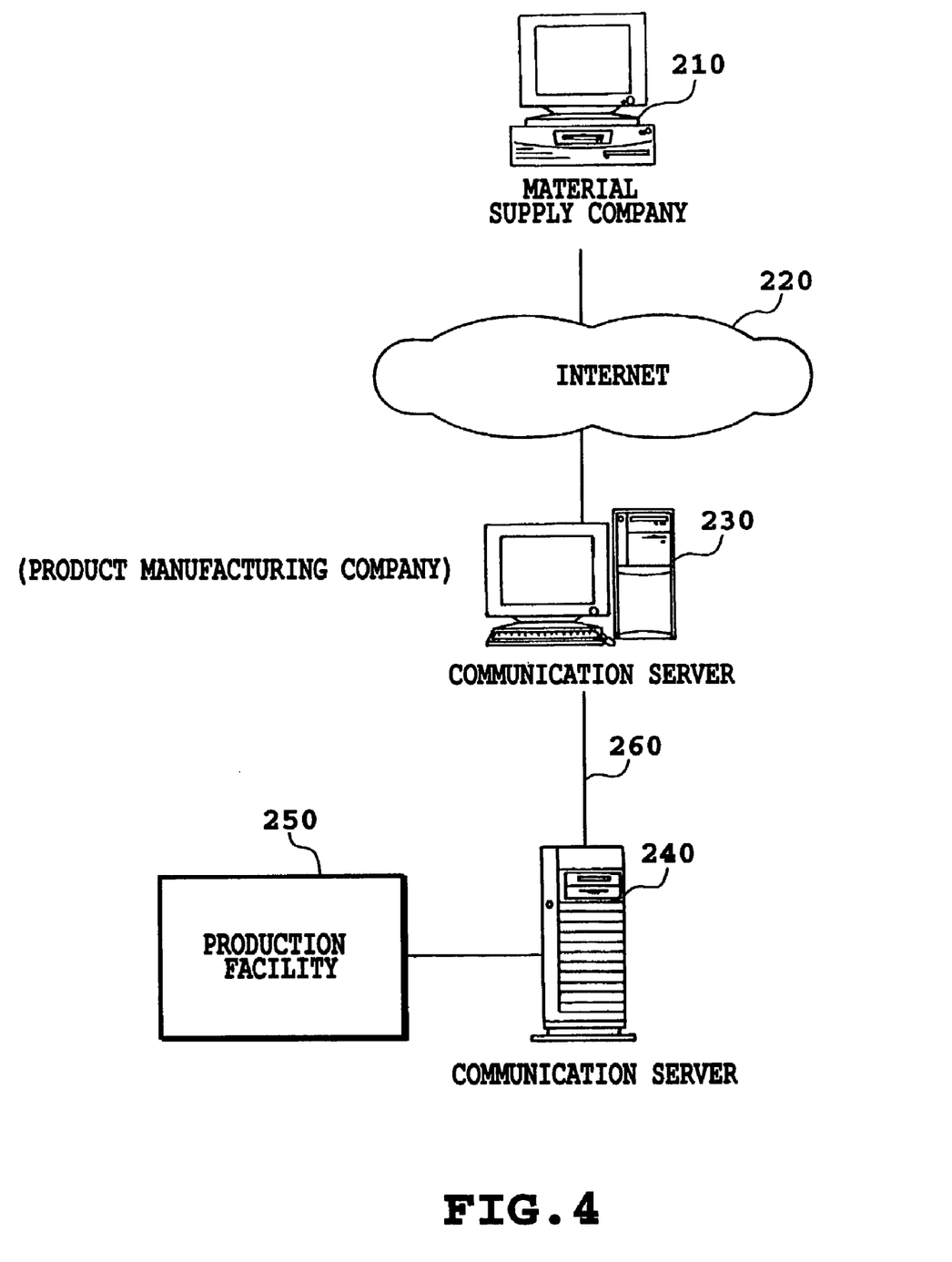
FIG. 4 is a block diagram showing a system configuration of a second embodiment of the present invention.

In the first embodiment, the example is described in which the computer 10 of the material supply company and the computer of the product manufacturing company are connected by a communication line such as a dedicated telephone line. Here, a second embodiment in which computers are connected via the Internet will be described. A system configuration of the second embodiment is shown in FIG. 4. In FIG. 4, a computer 210 (which is another part of information processing means of the present invention and has a modem or the like as communication means) of the material supply company is connected to the Internet 220. A communication server 230 (having a modem or the like as communication means) of the product manufacturing company is connected to the Internet 220. A result of measurement of a measurement apparatus (corresponding to the measurement apparatus 32 of FIG. 1; inputting means of the present invention) within a production facility 250 and information input from a not-shown terminal apparatus (inputting means of the present invention) are sent to a communication server 240 (a part of information processing means of the present invention). A yield is calculated in the communication server 240. The calculated yield is sent to the computer 210 of the material supply company via the communication server 230. A sales price calculated by the computer 210 of the material supply company is sent to the communication server 240 via the Internet 220 and the communication server 230. In this embodiment, the communication server 230 and the communication server 240 are connected by an intra-company LAN 260.

The following embodiments can be implemented other than the above-described embodiments.

1) The functions of the computer 10 and the computer 30 can be realized by one computer. In this case, the computer may be installed in either the material supply company or the product manufacturing company.
2) In the above-described embodiments, a yield is used as a parameter for determining a sales price. In addition, various parameters representing a production amount and a quality can be used as a parameter representing a state of production of a product.
3) It is sufficient for an expression for determining a sales price of a material to include at least a parameter representing a state of production of a product. It is needless to mention that the expression may include other parameters such as a supply amount of a material, a quality and the like.
4) In the above-described embodiments, distributed processing is performed in the computer systems installed in the material supply company and the product manufacturing company to determine a sales price. However, in a single computer system, a parameter representing a state of production of a product may be input from a keyboard or the like within the computer system, a sales price may be determined using the parameter by a CPU within the computer system, and the determined sales price may be outputted to be displayed on a display within the computer system. In addition, the parameter may be input from an external apparatus by communication.
5) According to the present invention, the terminal apparatus means an electronic apparatus equipped with at least inputting means for inputting information in a computer and outputting means for receiving information from the computer to output the information. The terminal apparatus may be further equipped with information processing means such as a CPU for performing information processing. As the inputting means, a pointing device such as a keyboard or a mouse, a communication apparatus for communicating information to an external apparatus, a disk drive for reading information from a recording medium such as a floppy disk, and the like can be used. As the outputting means, a printing apparatus, a memory apparatus, a communication apparatus for communicating information to an external apparatus, and the like can be used other than a display. According to the present invention, a form of using the terminal apparatus is classified into the following cases.

(1) A case in which a parameter representing a state of production of a product is input by inputting means within a terminal apparatus, a sales price is determined in information processing means in the outside of the terminal apparatus using the above-described parameter, and the determined sales prices is outputted from outputting means within the terminal apparatus.

(2) A case in which inputting means for inputting a parameter representing a state of production of a product and information processing means for determining a sales price using the above-described parameter are provided outside a terminal apparatus, and the determined sales price is outputted from outputting means within the terminal apparatus.

(3) A case in which inputting means for inputting a parameter representing a state of production of a product is provided outside a terminal apparatus, a sales price is determined by information processing means within the terminal apparatus, and the determined sales price is outputted from outputting means within the terminal apparatus.

(4) A case in which a parameter representing a state of production of a product is input by inputting means within a terminal apparatus, a sales price is determined by information processing means within the terminal apparatus, and the determined sales price is outputted from outputting means within the terminal apparatus.

(5) Other cases

In the above-described cases of (1) to (4), data can be transferred among the inputting means, the information processing means and the outputting means by wire, wireless or other communication or offline communication using a recording medium. However, if the inputting means or the like is provided outside the terminal apparatus, it is preferably connected with the terminal apparatus by a line. If the inputting means (and/or the information processing means) is provided inside the terminal apparatus, it is integrated with the outputting means. For example, if the computer 10 of FIG. 1 is integrated with the terminal apparatus 11, this means that the computer 30 is integrated with the terminal apparatus 33. Further, the terminal apparatus 11 of FIG. 1 is an example of a terminal apparatus in which the inputting means and the outputting means of the present invention are integrated. The terminal apparatus 33 of FIG. 1 is an example of a terminal apparatus that includes outputting means for outputting a sales price determined by information processing means. Naturally, it is also possible to input information for determining a sales price.

(6) A parameter representing a state of production of a product may be input from a terminal apparatus. However, as explained in the above-described embodiments, it is preferable to input the parameter directly from a measurement apparatus (also functioning as inputting means of the present invention) because input mistakes of a human can be avoided.

As described above, according to the present invention, a sales price of a material unilaterally determined by a material supply company conventionally is determined according to a state of production of a product that is manufactured using the material. Consequently, even in the case that becomes an object of a claim conventionally such as the case in which a quality of a material falls and a yield is worsened, since sales costs of the material is automatically and objectively determined, troubles and claims between the material supply company and the product sales company decreases.

What is claimed is:

1. A material sales system comprising: calculating means for calculating an expected product yield for a product that is manufactured by a product manufacturing company using a material supplied from a material supply company based on at least a quality of the supplied material, said expected product yield being calculated by the product manufacturing company;
   transmitting means for transmitting the calculated expected product yield from the product manufacturing company to the material supply company; information processing means for determining a sales price of said material sold to the product manufacturing company using at least the expected product yield calculated by said product manufacturing company; and
   outputting means for outputting the determined sales price from the material supply company to the product manufacturing company,
   wherein the material supply company sells the material to the product manufacturing company based on the determined sales price, and
   wherein the product manufacturing company calculates the expected product yield based on at least the quality of the supplied material, which is then transmitted to the material supply company for determining the sales price of the material based on a sales price equation previously agreed upon between the product manufacturing company and the material supply company such that the product manufacturing company is directly involved with determining the sales price of the material.

2. The material sales system as claimed in claim 1,
   wherein said calculating means is installed in said product manufacturing company.

3. The material sales system as claimed in claim 1,
   wherein a part of said information processing means is installed in said product manufacturing company and another part of said information processing means is installed in said material supply company.

4. The material sales system as claimed in claim 1, wherein communication means is provided in each of said material supply company and said product manufacturing company, and sends and receives at least one of the parameter representing a state of production of said product and said sales price between both the communication means through a communication line.

5. The material sales system as claimed in claim 1,
   wherein said parameter is resin and said product.

6. The material sales system as claimed in claim 1,
   wherein said product is an optical disk or an optical disk substrate.

* * * * *